March 6, 1928.

L. A. ARNSTEIN 1,661,401

BOTTLE CAPPING MACHINE

Filed April 23, 1923

INVENTOR
Leonard A. Arnstein
BY
Conrad A. Dietrich
his ATTORNEY

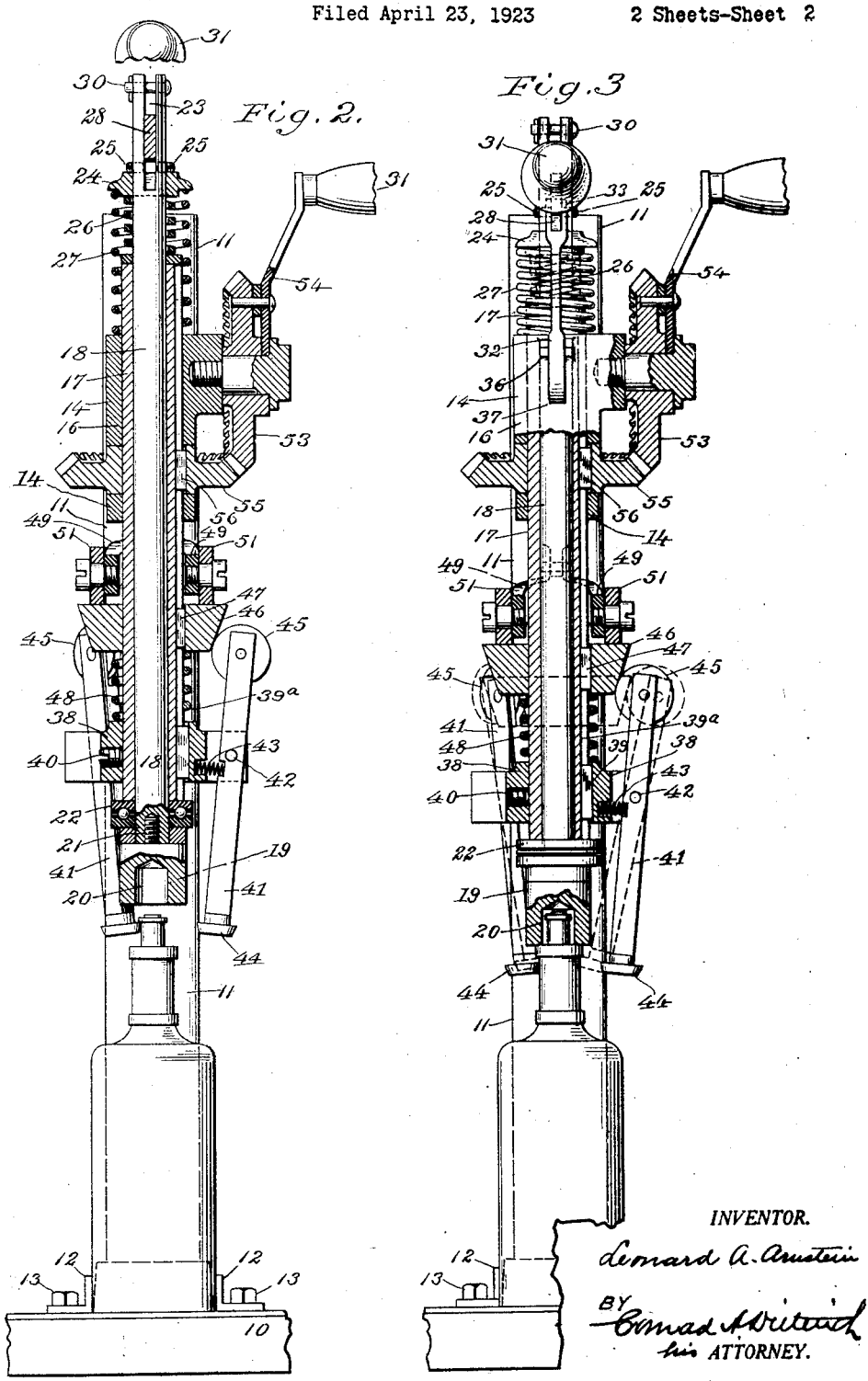

Patented Mar. 6, 1928.

1,661,401

UNITED STATES PATENT OFFICE.

LEONARD A. ARNSTEIN, OF NEW YORK, N. Y.

BOTTLE-CAPPING MACHINE.

Application filed April 23, 1923. Serial No. 633,875.

This invention relates generally to an improvement in bottle capping machines. Machines of this class are employed for the purpose of attaching metallic tops or caps to or around the mouths of bottles, and for this purpose usually comprise means for holding the bottle during the cap shaping operation, and means for spinning or shaping the cap to engage firmly with the mouth of the bottle. The latter means usually comprises a plurality of members having rollers thereon which, while engaging the cap or top, are rotated in order to cause the cap or top to be conformed closely to and engage with the mouth of the bottle or container. As an example of such a machine, attention is called to my Patent No. 1,251,166, dated December 25, 1917.

While the present invention is in part an improvement upon the features disclosed in the above-mentioned patent, yet in other respects it is a radical departure therefrom, and also from prior machines of this character which are not hand operated.

This invention relates to improvements in bottle-capping machines, and the same has for its object to provide a machine adapted for use in securing caps or tops to bottles or containers of varying heights or sizes.

Further, said invention has for its object to provide a machine which is comparatively small and compact so as to permit of its being moved from place to place, at will.

Further, said invention has for its object to provide a machine which may be either power operated, or manually operated, as desired.

Further, said invention has for its object to provide a machine in which the bottle or container holding mechanism may be initially adjusted to approximately the position required for subsequent operations, and yieldingly maintained to such adjusted position.

Further, said invention has for its object to provide a machine in which the bottle holding means may be locked in operative position during the subsequent manipulation or subsequent operations.

Further, said invention has for its object to provide a machine in which the means for adapting the machine to bottles or containers may be readily adjusted, and the spring pressure under which the bottle is held, varied as required.

Further, said invention has for its object to provide a machine in which the rotation of the fingers or members, which serve to conform the top or cap to a bottle, as well as the degree of pressure with which said fingers or members are caused to engage or contact with said cap or top, may be maintained throughout the operation under the touch or control of the operator's hand.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings showing an illustrative embodiment of the machine,

Figure 2 is a sectional elevation thereof taken on the line 2—2 of Fig. 1, looking in the direction of the arrows, and Fig. 3 is a sectional elevation similar to that of Fig. 2 showing the parts in operative position.

Figure 1:
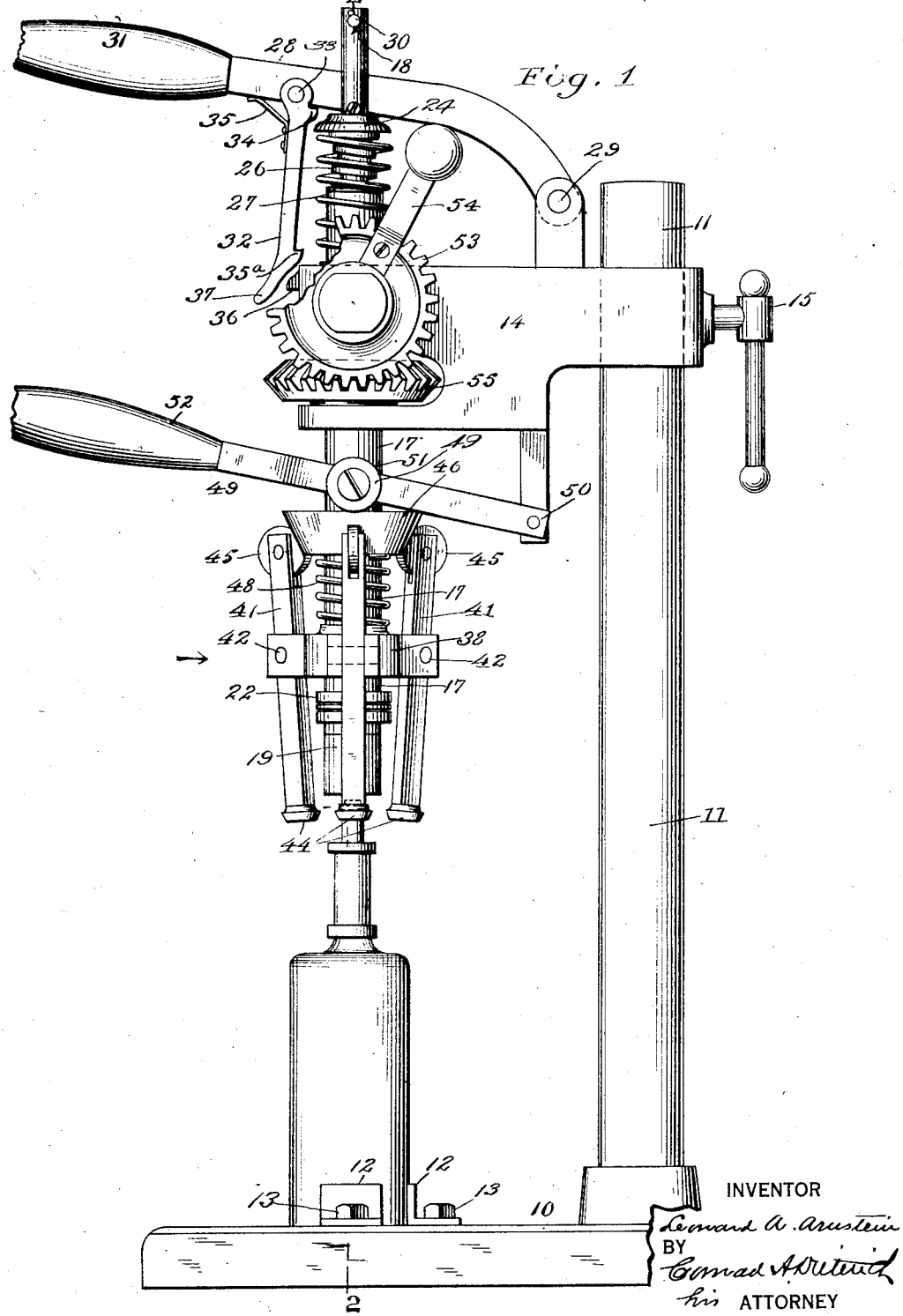
Figure 1 is a view in side elevation, with the parts in inoperative position.

The embodiment of the invention, illustrated in the drawings to which reference is made, comprises a base 10 and a standard 11 extending vertically therefrom. The base 10 supports the bottle to be capped and is provided with angular members or guides 12 which are adjustably secured by means of nuts 13 to receive and fit bottles of different sizes. The guides 12, when once adjusted properly, position the bottles with reference to the remainder of the apparatus, so that they can be properly capped.

The operating part of my improved machine is mounted upon an arm or support 14 which is adjustably secured to the standard 11 whereby the operating part may be raised and lowered relative to the base, and relative to the bottle thereon to adjust the apparatus to bottles of different heights. The clamping device 15 for adjustably securing the arm 14 to the standard may be of any well known construction.

The arm 14 has a vertical bearing 16, the axis of which is at right angles to the base 10, and in which is slidably mounted and supported a sleeve 17 concentric with a plunger or bottle engaging member 18 passing through it and movable with it relatively to the base 10. The lower end of the plunger 18 terminates in what I term an "adapter" 19 having a recess 20 therein at its lower end to receive any projecting portion on the stopper of the bottle. This adapter can be removably and replaceably secured (as indicated at 21) to the plunger 18 whereby adapters of different sizes may be employed according to the type of bottle to be capped.

The sleeve 17 is rotatably mounted on the plunger 18 and at its lower end the latter forms a bearing 22 therefor which is preferably a ball bearing as shown. The opposite end of the plunger 18 has a vertical slot 23 therein, and slidably mounted upon this end of the plunger is an abutment 24 which is prevented from disengaging the plunger by means of the set screws 25 located above the abutment, and threaded into the opposite sides of the plunger. A coil spring 26 is interposed between the abutment 24 and the upper end of the sleeve 17. This spring not only serves to hold the sleeve against the bearing 22 at the lower end of the plunger 18 but also serves to exert a spring pressure upon the top of the bottle when the plunger is depressed relatively to the base 10 to engage the bottle.

A coil spring 27 is also interposed between the abutment 24 and part of the arm 14 to normally force the abutment 24 against the screws 25, and to maintain the plunger 18 in inoperative position out of engagement with the bottle. The spring 26 is much stronger than the spring 27, that is it requires more force to compress or stress the spring 26 than it does to compress or stress the spring 27.

A manually operable means or lever 28 is pivoted at 29 upon the arm 14, and extends forwardly, that is, towards the side on which the operator stands while operating the machine, over the abutment 24, and through the slot 23. A pin 30 secured on the plunger extends across the slot 23 to hold the lever 28 in place in the slot, the lever extending forwardly and being provided with a suitable actuating handle 31 for relatively moving the bottle engaging member 18 and base 10 to hold the bottle in place. A detent or latch 32 is pivoted at 33 to the lever 28 and has a stop 34 on one side which is forced against the lower edge of the lever by means of a spring 35, one end of the spring 35 being secured to the detent and the other end engaging the lower edge of the lever. The detent 32 has a nose 35ª adapted to cooperate with a lug 36 on the arm 14, whereby when the handle 31 is depressed the detent 32 will automatically engage the lug 36 holding the plunger depressed and in operative position, that is in engagement with the top of the bottle.

When it is desired to release the detent 32 all that is necessary is to grasp its projecting lower end 37, disengaging it from the lug 36, the spring 27 thereupon raising plunger 18 out of engagement with the bottle.

Adjustably secured to the lower end of the sleeve 17 is a head 38 which is keyed to the sleeve by means of a key 39 riding in the keyway 39ª formed longitudinally in the sleeve, enabling it to be moved longitudinally of the sleeve to adjust it to bottles of different heights. For adjustment the head 38 is secured to the sleeve in the desired position by means of a set screw or screws 40 (Fig. 2). Mounted upon the head 38 is a cap spinning device which comprises a plurality of fingers 41 pivoted at 42 between their ends to the head 38, and held normally in inoperative position by means of springs 43 interposed between the head 38 and the fingers 41 at points below the pivots 42. Upon the lower ends of the fingers 41 are the rotatably mounted rollers 44 which engage the caps or tops when the lower ends of the fingers are moved inwardly to spin them into place. The opposite ends of the several fingers 41 are provided with anti-friction elements or rollers 45 which engage a sliding cam or finger actuating member 46. The cam 46 is keyed to the sleeve 18 by means of a key 47 and the keyway 39ª, and is adapted to slide longitudinally of the sleeve and plunger.

Interposed between the cam 46 and the head 38 is a coil spring 48 which normally maintains the cam raised, that is in inoperative position. The means for actuating cam 46 to move the lower ends of the several fingers inwardly to cap spinning position comprises a manually operable lever 49 which is pivoted at 50 to a part of the arm 14 and extends forwardly, that is toward the operator over the cam 46, being provided with anti-friction devices or rollers 51 engaging cam 46, and terminating at its outer end in the handle 52. This lever 49 is bifurcated, that is, from the handle 52 it is divided into two parts which extend upon opposite sides of the plunger and sleeve. When the handle 52 is depressed by hand the cam 46 engages the upper ends of the several fingers, causing their lower ends to move into cap spinning position. This pressure, exerted by the operator on the fingers, however, is yieldingly resisted, that is, as the handle 52 is depressed, the spring 48 tends to oppose the motion and the exact pressure which the operator needs to apply in order to properly cause the rollers 44 to engage the bottle and the cap to be spun can be determined by experience.

The sleeve 18 is rotated by hand by means of a bevel gear 53 which is journaled on the arm 14, is rotated preferably by means of a crank 54 and meshes with a gear 55 keyed by means of a key 56 and keyway 39ª to the sleeve 17, the gear 55 being so mounted in the arm 14 as to remain stationary when the sleeve 17 and plunger 18 are reciprocated or actuated. Upon the rotation of the crank 54, the sleeve 17 is rotated, rotating the several fingers 41. The machine may also be driven by a motor, when desirable, replacing the crank 54.

The manner in which the above described machine is adjusted for any particular bottle which it is desired to cap will first be described: In adjusting the vertical position of the arm 14 the handle 31 is first depressed until the detent 32 engages the lug 36 and while in this position the arm 14 is lowered. This is done by loosening the clamping device 15 and raising or lowering the arm 14 until the lower end of the adapter 19 is slightly higher than the bottle which it is desired to cap. The bottle is now placed on the base or table 10, with the detent 32 in engagement with the lug 36, whereupon the arm 14 is lowered by shifting the same downwardly upon the standard 11 until the adapter 19 is in contact with the top of the bottle cap. The downward movement of the arm 14 is continued a short distance further in order to subject the bottle and the cap thereon to a slight spring pressure, whereupon the clamping device 15 is actuated to secure said arm 14 to its adjusted position. The exact pressure desired may be determined by trial.

After the position of the arm 14 has been determined in the manner above described, it may be necessary to also adjust the height of the lower ends 44 of the several fingers 41, these fingers being located at their lower ends below the lower end of the adapter 19. To adjust the vertical position of the several rollers 44 the set screws 40 are loosened so that the head 38 is free to slide on the sleeve. The fingers 41 are now grasped by the hand and pressed into contact with the bottle cap or top, and are then adjusted vertically as nearly as can be judged to their operative position. While the rollers 44 are held in this way in tentatively adjusted position the set screw or screws 40 are then tightened. The machine should then be tried out and the setting altered slightly, if necessary.

After the machine has been adjusted or set as above described, it is ready for operation. Assuming that the latch 32 has been disengaged from the lug 36, the bottle with the cap in position is now placed upon the table or base 10 between the guides 12. The handle 31 is then depressed until the latch 32 is in engagement with the lug 36, the bottle thereby being held by spring pressure due to the movement of the plunger relative to the base. This movement of the handle 31 depresses the sliding or floating abutment 24, moving it downwardly and also therewith the spring 26, sleeve and plunger, the spring 26 having sufficient rigidity as not to yield until the adapter 19 engages the top of the bottle. When the adapter thus engages the top of the bottle, continued movement of the handle 31 merely depresses the abutment 24 and compresses or stresses the spring 26, thereby imposing the required amount of spring pressure on the top of the bottle. This spring pressure should be so adjusted as not to damage the bottle. Thereupon the latch 32 automatically engages lug 36 and the machine is ready for the cap spinning operation. The depression of the abutment 24 also compresses or stresses the spring 27, thereby storing up energy whereby, on release of lever 31, the spring 27 returns the parts to inoperative position, that is, causes the plunger and adapter 19 to disengage the bottle, allowing its removal. Inasmuch as the downward movement of the handle 31 automatically locks it, the operator is now free to use both hands in the succeeding operation of the machine. He, thereupon, rotates the gears by means of the handle or crank 54 with one hand, and with his other hand grasps the handle 52 and depresses the cam 38 to cause the rollers 44 to engage the cap or top. After the cap has been spun on the bottle the handle 52 is released, the latch 32 tripped, and the bottle removed.

By the construction above described I have provided a machine which can not only be adapted to bottles of different sizes and shapes, but which can also be quickly and efficiently operated by hand without detrimental effect on the bottle, that is without causing any large amount of breakage.

All the operating parts including the actuating handles 31 and 52 and the gears are mounted upon the arm 14, and move therewith when it is adjusted to adapt it for a bottle of given size.

Unlike other machines, my cap spinning device can be manually controlled by means of the handle 52 to cause the rollers 44 to engage the cap with any desired degree of pressure.

The degree of pressure exerted by the operator upon the bottle through the rollers 44 and cap can be accurately gauged by experience.

The machine can also be conveniently operated because all that is necessary after the bottle has been placed in position upon the base, is for the operator to depress the handle 31 which thereupon automatically locks the plunger in depressed position in engagement with the bottle holding the latter under spring pressure. The operator's hands are now free for the successive operations. With one hand he then rotates the crank 54 at the required speed and gradually depresses the lever 52 with his other hand until the cap is spun in position. Thereupon the levers 31 and 52 are released and the bottle removed.

The term "bottle" as used herein has a very broad meaning, and may be considered to designate all articles capable of being acted upon or capped by the machine herein described and claimed.

Having thus described my said invention what I claim and desire to secure by Letters Patent is:

1. A machine of the character described comprising a base for a bottle or other container, a support, a plunger slidably mounted on said support, manually operable means for actuating said plunger to engage said bottle, yielding means interposed between said actuating means and said plunger for maintaining said plunger in engagement with the bottle under spring pressure, means for retaining said actuating means in depressed position, a cap-forming device rotatably mounted on said plunger, a manually operable lever controlling the position of said cap-forming device, and means for rotating said device whereby to secure a cap to said bottle or container, substantially as specified.

2. A machine of the character described comprising a base for a bottle, a support, a plunger slidably mounted on said support, a manually operable lever for actuating said plunger to engage the bottle and including a spring for maintaining the plunger in engagement with the bottle under spring pressure, means for locking said plunger in engaging position, a cap spinning device rotatably mounted on said plunger, a manually operable lever for controlling the position of said device, and means for manually rotating said device, substantially as specified.

3. A bottle capping machine comprising a base for a bottle, a support, a plunger slidably mounted on said support, manually operable means for actuating said plunger to engage the bottle and including a spring for maintaining the plunger under spring pressure in engagement with the bottle, a spring for disengaging said plunger, a rotatable cap spinning device mounted on said plunger, manually operable means for moving said device into cap spinning position, a spring for moving said device in the opposite direction, and means for rotating said device, substantially as specified.

4. A bottle capping machine comprising a base for a bottle, a support, a plunger and a sleeve slidably mounted on said support, said sleeve being rotatable on said plunger, manually operable means for actuating said plunger to engage a bottle, a spring interposed between said actuating means and said plunger for maintaining said plunger under spring pressure in engagement with said bottle, a cap spinning device secured to said sleeve to rotate therewith and comprising fingers movable into and out of cap engaging position, a cam slidable on said sleeve for actuating said fingers, manually operable means for actuating said cam in one direction, a spring for moving said cam in the opposite direction, a spring interposed between said actuating means and said support for actuating said plunger to disengage the bottle, and means for rotating said sleeve and said fingers substantially as specified.

5. A bottle capping machine comprising a support, a plunger slidably mounted on said support, an abutment slidable on said plunger and retained thereon, a spring interposed between said abutment and a portion of said plunger, means engaging said abutment for actuating the same to actuate said plunger through said spring to engage the head of a bottle, thereby placing the bottle under spring pressure, and a spring interposed between a part of said support and said abutment for disengaging the bottle when said actuating means is released, substantially as specified.

6. A bottle capping machine comprising a base for a bottle, a support, a bottle engaging member, means for relatively moving said base and said member comprising a plunger slidably mounted on said support, an abutment slidably mounted on said plunger and supported thereby at the end remote from said base, means for retaining said abutment thereon, a spring interposed between a part of said plunger and said abutment, a lever pivoted on said support and engaging said abutment whereby said abutment may be depressed and the plunger actuated to hold a bottle under spring pressure, and a spring for moving said plunger in the opposite direction, substantially as specified.

7. A bottle capping machine comprising a standard having a bearing, and a base below said bearing for supporting a bottle, a plunger slidably mounted in said bearing and movable towards and away from said base to engage and disengage the head of the bottle to hold the same, means for actuating said plunger, a sleeve mounted on said plunger for movement therewith and rotatable thereon, means for rotating said sleeve, a cap spinning device mounted on said sleeve for rotation therewith and comprising fingers movable into and out of engagement with said cap for spinning the same, a finger actuating member mounted on said sleeve and movable longitudinally thereof to move said fingers, and means for actuating said member, substantially as specified.

8. A bottle capping machine comprising a base for a bottle and a support, a bottle engaging plunger slidably mounted on said support and adapted to be moved into and out of engagement with a bottle to hold the same, a sleeve mounted on said plunger for movement therewith and rotatable thereon, a cap spinning device secured to said sleeve and comprising fingers movable into and out of engagement with said bottle to spin a cap thereon, a finger actuating member movable longitudinally of said sleeve, means for rotating said sleeve, manually operable means for actuating said plunger and said sleeve to engage and disengage a bottle, and manually operable means controlling said finger actuating member, substantially as specified.

9. A bottle capping machine comprising a support and a base for a bottle, a bottle engaging member mounted on said support for holding the bottle in position during the capping operation, manually operable means for relatively moving said base and said member to engage and disengage the bottle, a cap spinning device rotatably mounted and comprising fingers movable into and out of spinning position, manually operated means for rotating said spinning device, manually operable means for moving said fingers into spinning position, and means for locking said member in bottle holding position to permit of the manual control of said cap spinning device, substantially as specified.

10. A bottle capping machine comprising a base for supporting a bottle and a support, a plunger slidably mounted on said support to engage and disengage the bottle, a spring for moving said plunger out of engagement with the bottle, manually operable means for moving said plunger into bottle engaging position and stressing said spring, a cap spinning device rotatably mounted on said plunger and comprising fingers movable into and out of engagement with the head of a bottle, a member movable axially of said plunger for controlling the position of said fingers, a manually operable lever pivoted to said support and engaging said member for actuating said fingers to move the same into operative position, and a spring for moving said member in the opposite direction to release said fingers; said last named spring being stressed during the manual operation of said lever, substantially as specified.

11. A bottle capping machine comprising a base and a support, a plunger slidably mounted on said support for engaging and disengaging a bottle to hold the same, means for actuating said plunger in opposite directions including a manually operable lever and spring, means for locking said plunger in bottle engaging position, cap spinning fingers rotatably mounted on said plunger and movable into and out of cap spinning position, means controlling said fingers comprising a manually operable lever and spring, and means including a manually operable crank for rotating said fingers, substantially as specified.

12. A bottle capping machine comprising a base and a standard thereon, an arm adjustably mounted on said standard to move towards and away from said base, a plunger slidably mounted on said arm, a spring interposed between parts of said plunger and said arm for maintaining the former in raised position, a cap spinning device rotatably mounted upon said plunger and movable into and out of cap spinning position, means for controlling said device to cause the same to move into and out of cap spinning position, means including a spring for actuating said plunger and placing said bottle under spring pressure, and means mounted on said arm for rotating said device, said arm being adjustable to properly position the same to obtain a desired spring pressure on the bottle when the plunger actuating means is depressed, substantially as specified.

13. A bottle capping machine comprising a support and a base, a plunger slidably mounted on said support and adapted to engage a bottle resting on the base, a spring tending to disengage said plunger from the bottle, a lever for actuating said plunger to engage a bottle and to place the spring under stress, a spring pressed detent pivoted to said lever and movable therewith, means adapted to engage said detent for automatically locking said lever when depressed, a cap spinning device rotatably mounted on said plunger, means for moving said device into and out of cap spinning position, and means for rotating said device, substantially as specified.

14. A bottle capping machine comprising a support, a plunger and a sleeve slidably mounted on said support and movable to engage a bottle, said sleeve being rotatably mounted on said plunger, an abutment slidable on the plunger and retained thereon, a spring interposed between said abutment and a part of said support and tending to raise said plunger and said sleeve, a spring interposed between said abutment and said sleeve, means acting through said abutment and said last named spring for actuating said plunger, fingers pivoted on said sleeve and movable into and out of cap spinning position, means for so moving said fingers, and means for rotating said sleeve, substantially as specified.

15. A bottle capping machine comprising a fixed base and a standard thereon, an arm adjustably mounted on said standard towards and away from said base, a plunger slidably mounted on said arm to engage and disengage the bottle resting on the base, means on said arm for actuating said plunger, said arm being adjustable to permit said plunger, when actuated, to properly engage the bottle, a cap spinning device rotatably mounted on said plunger and comprising fingers movable into and out of cap spinning position, said fingers being vertically adjustable to enable them to properly engage the cap when in cap spinning position and to adjust them to correspond with the arm adjustment, actuating means on said arm for controlling the movement of said fingers into and out of cap spinning position, and actuating means mounted on said arm for rotating the cap spinning device, substantially as specified.

16. A bottle capping machine comprising a base and a support, a plunger and a sleeve slidably mounted on said support, said sleeve being concentric with said plunger and rotatable thereon, a spring interposed between a portion of said plunger and a portion of the support for maintaining said plunger and sleeve in raised position, a lever pivoted at one end to the support and extending towards the front and over the upper end of the plunger whereby said plunger may be actuated to compress said spring and engage the head of a bottle, means for locking said plunger in bottle engaging position, movably mounted fingers pivoted to the lower end of said sleeve to rotate therewith and movable into and out of cap spinning position, a cam slidably mounted on said sleeve and movable to engage and disengage said fingers for actuating the same, a spring interposed between a portion of said sleeve and said cam for moving the latter out of finger engaging position, a lever pivoted at one end to the support and extending forwardly over said cam whereby the latter may be actuated, gearing mounted on said support and keyed to said sleeve for rotating the latter, and a crank secured to said gearing for rotating the same, substantially as specified.

Signed at the city of New York, in the county and State of New York, this 21st day of March, one thousand nine hundred and twenty-three.

LEONARD A. ARNSTEIN.